United States Patent [19]

Pedroia

[11] Patent Number: 5,221,228
[45] Date of Patent: Jun. 22, 1993

[54] DEVICE FOR FORMING THE SUSPENSION LOOP OF A SAUSAGE WITH A STRING-HOLDING REEL WITH HEADS PROVIDED WITH VERTICES IN A MACHINE FOR TYING SAUSAGE

[76] Inventor: Luigi Pedroia, Via Cadogno 1, 6648 Minusio, Switzerland

[21] Appl. No.: 830,879

[22] Filed: Feb. 4, 1992

[30] Foreign Application Priority Data

Feb. 15, 1991 [CH] Switzerland .............. 467/91

[51] Int. Cl.⁵ .................................. A22C 11/12
[52] U.S. Cl. ............................. 452/48; 452/46
[58] Field of Search ................... 452/48, 47, 46

[56] References Cited

U.S. PATENT DOCUMENTS

| | | |
|---|---|---|
| 4,394,987 | 7/1983 | Pedroia . |
| 4,401,329 | 8/1983 | Pedroia . |
| 4,694,537 | 9/1987 | Kollross ............... 452/48 |
| 4,750,239 | 6/1988 | Niedecker ............. 452/48 |
| 4,991,792 | 2/1991 | Pedroia . |
| 5,049,108 | 9/1991 | Staudenrausch ....... 452/48 |

Primary Examiner—Willis Little
Attorney, Agent, or Firm—Young & Thompson

[57] ABSTRACT

A device automatically forms a suspension loop of sausage at preprogrammable intervals in a machine for automatically tying, by string with a knot, meat stuffed in a casing. The machine has an orifice through which a stuffed casing passes, jaws for gripping the casing, a reel for holding a reserve of string, and a guide for moving the reel around the casing. The reel makes it possible to avoid unwinding of the string by inertia in a descent phase within the guide due to the fact that the reel has two heads which have identical geometric shapes provided with vertices, i.e. points. These vertices run along the guide with friction of a preset amount so that the vertices are able to make the reel, at the end of a movement cycle around the casing, retain a preset kinetic energy.

5 Claims, 4 Drawing Sheets

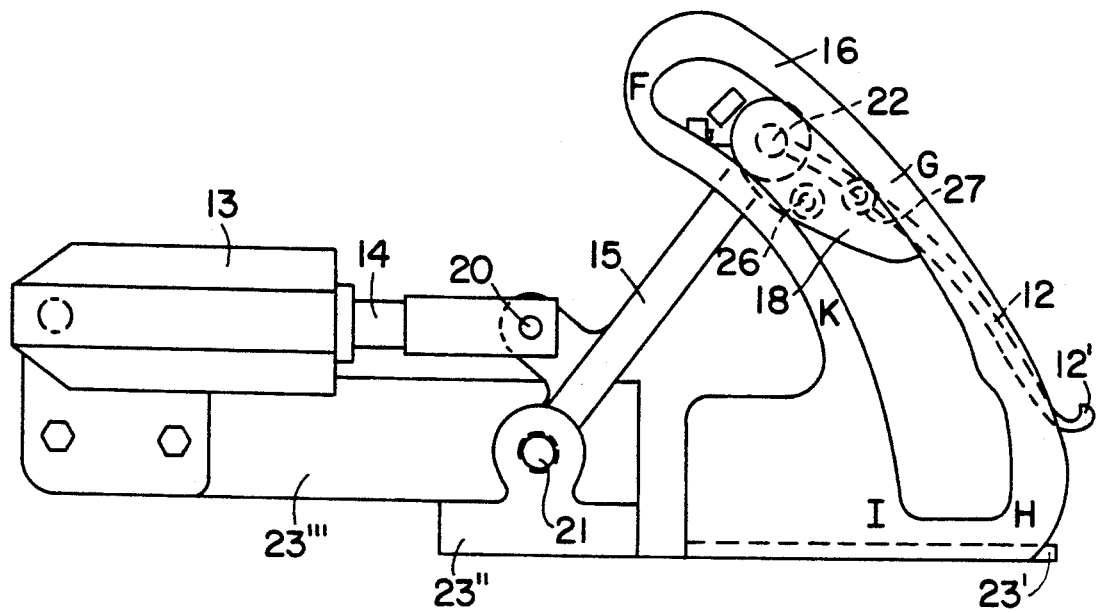
FIG. 7
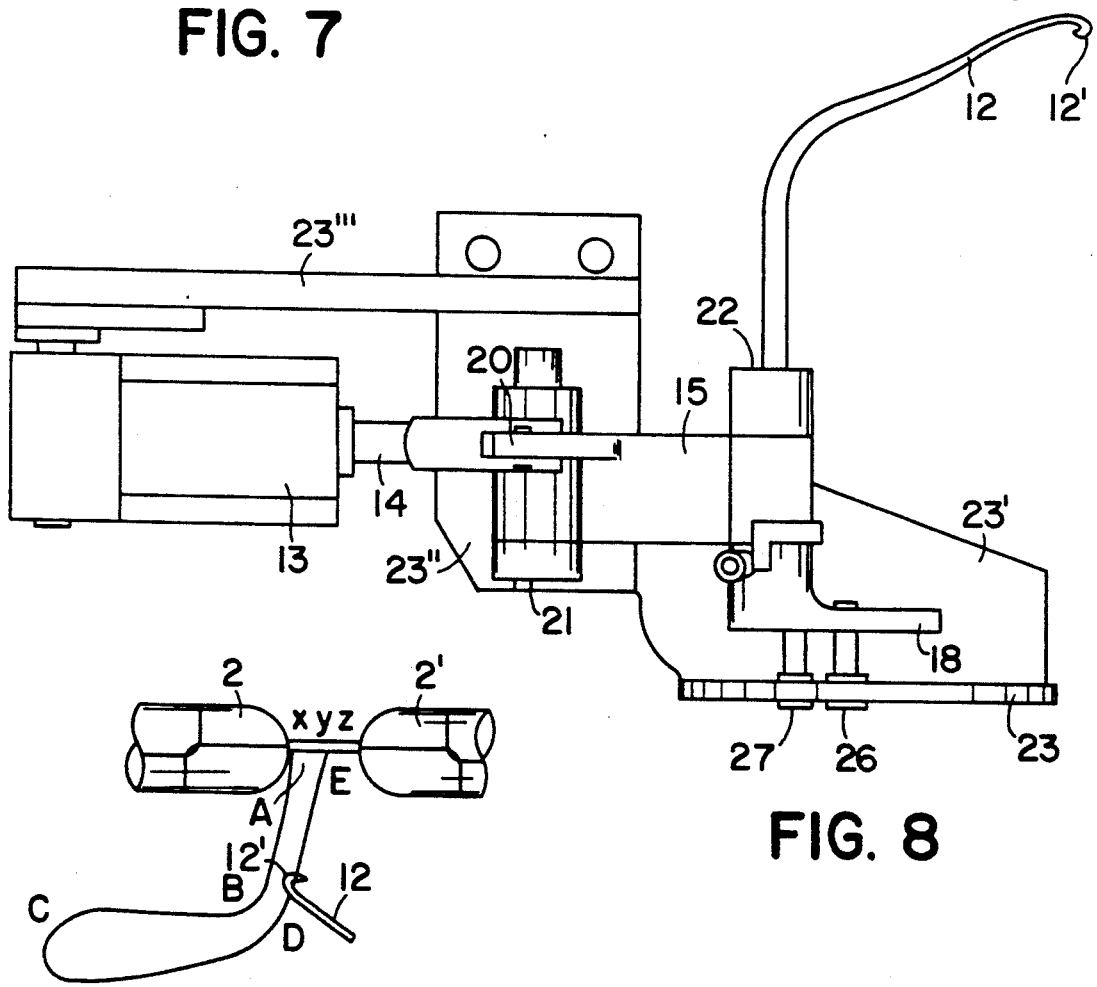
FIG. 8
FIG. 9

DEVICE FOR FORMING THE SUSPENSION LOOP OF A SAUSAGE WITH A STRING-HOLDING REEL WITH HEADS PROVIDED WITH VERTICES IN A MACHINE FOR TYING SAUSAGE

BACKGROUND OF THE INVENTION

Machines are known for automatically tying with a knot, with string or the like, meat stuffed in a casing (see in this connection Swiss Patent No. 587,600 of the same applicant).

These known machines comprise: an orifice through which the stuffed casing passes, interpenetrated jaws able to grip the casing for a certain section at the tying or tyings, so as to free said section of sausage and arrange it for tying; a reel or spool holding a reserve of string or the like and elements suitable for moving and guiding said reel or spool around the compressed casing section to arrange the string in a closed polygonal, curved or circular path so as to allow the reel to pass, with the final introduction of the reel itself in said curved or circular polygon or path, with successive tractions of the string by rotation of the reel itself, to make a knot around said casing section and to grip it, with output of the string adhering to the casing.

SUMMARY OF THE INVENTION

This invention has as its object a device for automatically forming the suspension loop of a sausage, at pre-programmable intervals, in said machine or in similar machines.

BRIEF DESCRIPTION OF THE DRAWINGS

The accompanying drawings represent in:

FIGS. 7 and 8, respectively, side and front views of a preferred first embodiment of the device according to the invention;

FIG. 9, the travel of the movable gripping element in forming the loop;

DETAILED DESCRIPTION OF THE PREFERRED EMBODIMENTS

Figure 1:
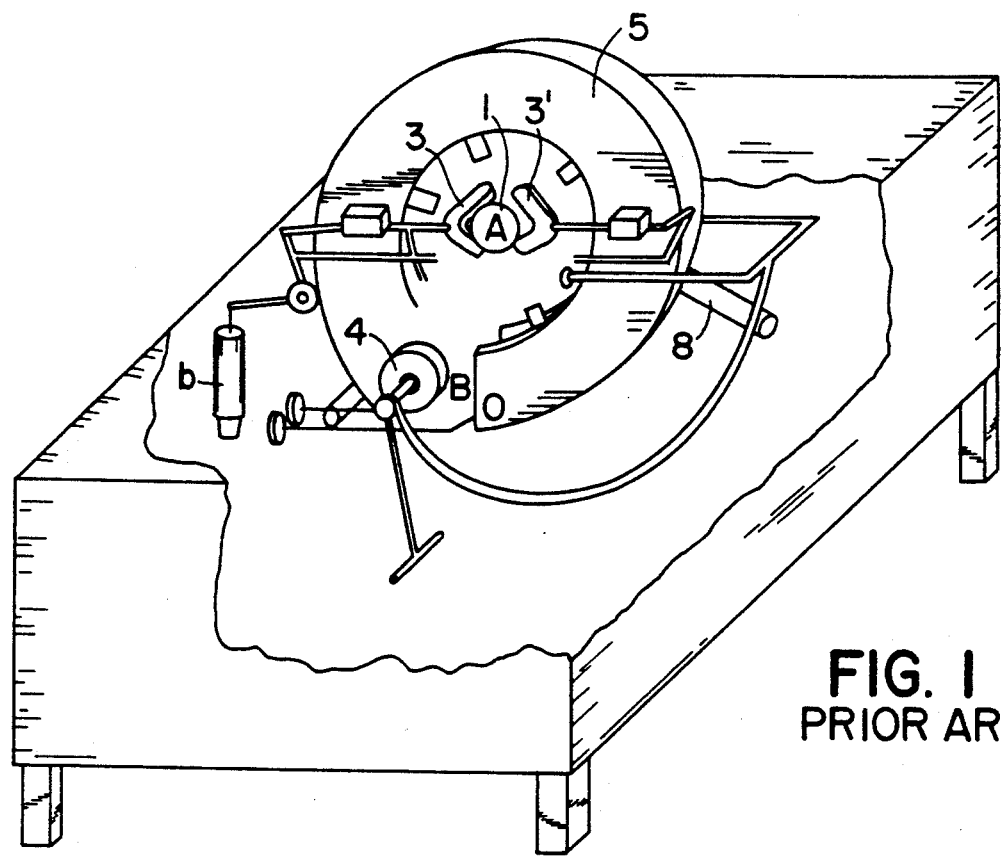
FIGS. 1 to 6, the main parts making up the known machines for automatic tying of meat stuffed in a casing, with particular reference to that according to Swiss Patent No. 587,600 of the same applicant.
Figure 2:
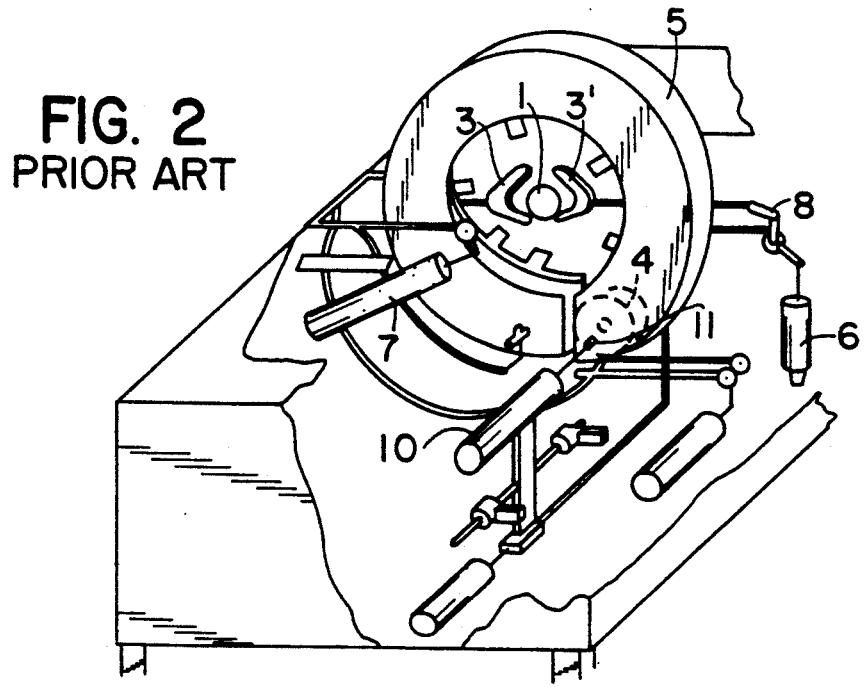

With reference to FIGS. 1 to 6, the machine according to Swiss Patent No. 587,600 comprises: an orifice 1 (FIG. 1) through which a stuffed casing 2, 2' passes (FIGS. 3, 4, 5), interpenetrated jaws 3, 3' (FIGS. 1, 2) able to grip the casing 2, 2' for a certain section x-y (FIG. 5) at the tying or tyings, so as to free said section of sausage and arrange it for tying; a reel or spool 4 holding a reserve of string or the like and elements 5, 6, 7, 8, suitable for moving and guiding said reel or spool 4 around the compressed casing section to arrange the string in a closed polygonal, curved or circular path (FIGS. 3 and 4) so as to allow the reel 4 to pass, with the final introduction of the reel 4 itself (FIG. 4) in said curved or circular path, with successive tractions of the string by rotation of the reel 4 itself around elements 10, 11, to make a knot around said casing section and to grip it, with output of the string adhering to the casing 2, 2'.

The device in question, to make the loop, according to said preferred embodiment, comprises: a movable shaft 12 for gripping straight string section AB (FIG. 9) that goes from orifice 1 to reel 4. The movable shaft 12 (FIGS. 7, 8, 9) ends at one end in a hook 12' and hinged at the other end at pin 22 to a cam-shaped shoe 18 provided with a device of known type, for example, a spring stop plane, which reversibly locks shoe 18 in position relative to the pin 22. The shoe 18 itself assumes this position when it is completely placed by the effect of the action of a pneumatic cylinder 13 on a plane surface 23' of the support frame 23, 23'', 23'''.

It is important for the good functioning of the device, with suitable arrangements such as shields or dividing plates, to keep hook 12' from interfering with the material being worked; given their general nature such arrangements are not represented in the figures.

Shoe 18 carries two tappets 26, 27 of which the first tappet 26 travels, in its forward passage, over lower profile F K I (FIG. 7) of a link cam 16. The second tappet 27 in its return passage, travels over upper profile H G F of the same cam 16. Pin 22 of said shoe 18 in is carried by an arm 15 hinged at its other end 21 to support frame 23 of the unit. Arm 15 is actuated at its intermediate point 20 by a piston 14 of a hydraulic or the pneumatic cylinder 13. The unit is designed so that the simultaneous action of the two cams, i.e. link cam 16 and that constituted by shoe 18, make the shaft 12 perform the movements necessary for making loop A, B, C, D, E (FIG. 9).

It is provided that other devices can actuate shaft 12 or the equivalent, without going outside the scope of protection of the patent.

Figure 10:
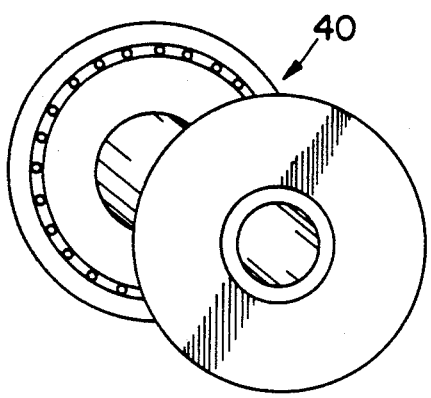
FIG. 10, the perspective view of a reel according to the prior art, exhibiting the above-mentioned drawbacks.

An important and delicate function is performed in the device of the invention by the reel 4. In some types of existing machines, for example, that disclosed by Swiss Patent No. 587,610, such reel 40 exhibits two flanges circular in shape (see FIG. 10). Said flanges, sliding against the inside walls of guide 5 (See FIG. 1) during the descent phase of the reel 40 to resume its initial position after having made a knot, rotate by friction causing an undesirable unwinding of the string from the reel 40, an unwinding that increases the length of the section of string that then has to be rewound before starting to make a new knot.

This unwinding leads to a considerable loss of time that lowers the working speed of the machine by 23-25%, with a serious loss of time at the end of a work day (it is considered that the machine can make 32-50 knots during the first minute!).

The reel 4 provided in the device, which is the object of the invention, completely eliminates this drawback.

Figure 11:
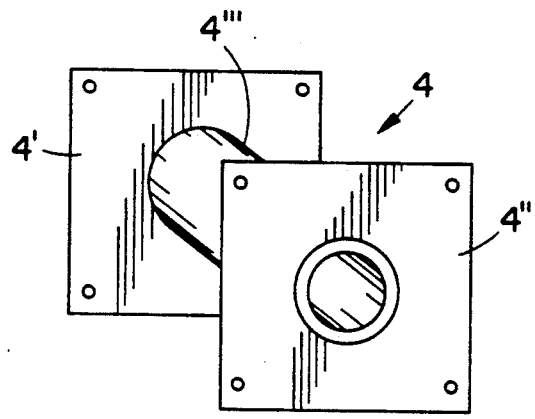
FIG. 11, the perspective view of a preferred embodiment of the reel of the device which is the object of the invention.
Figure 13:
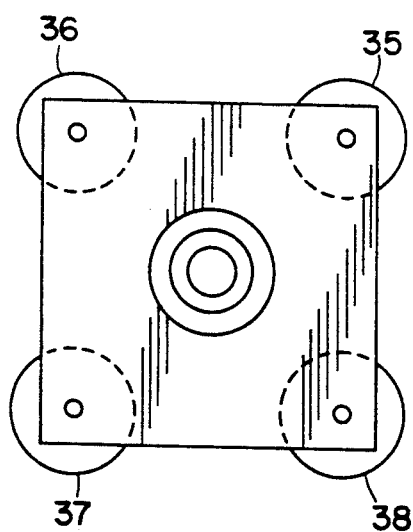
FIG. 13, the side view of the reel of FIG. 12.
Figure 12:
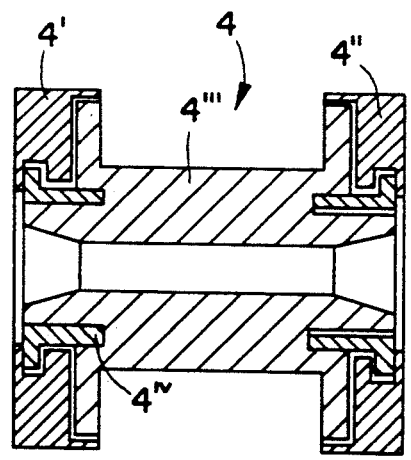
FIG. 12, the axial section of the reel of FIG. 11.

The reel 4 has two heads 4', 4" (FIGS. 11, 12, 13) with a geometric shape provided with vertices that run along guide 5 with a friction of a preset amount which is able to make reel 4, at the end of a movement cycle, retain a preset kinetic energy.

This retention is achieved in the device of the invention by making heads 4', 4", or at least their vertices, with self-lubricating antifriction synthetic resins, or by applying rolling elements 35, 36, 37, 38 at the vertices.

Figure 6:
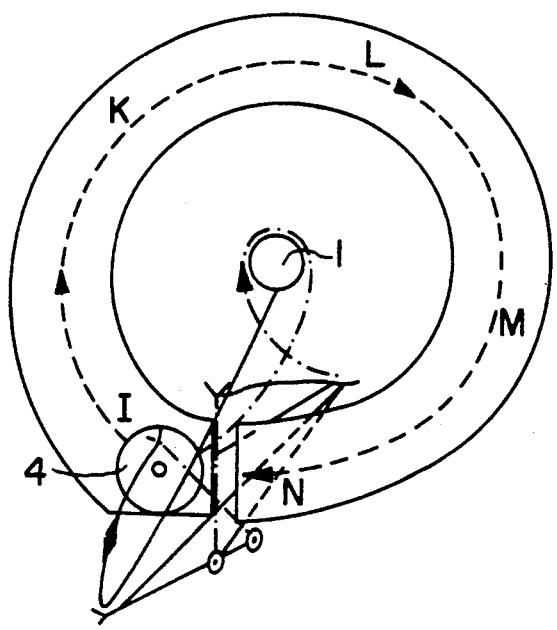

The first solution comprising, as can be guessed, a relatively greater friction, has proved more suitable for making the reel 4, when at the end of a movement cycle, again reach the starting position N in FIG. 6. Therefore the reel 4 has a very limited residual kinetic energy, thus avoiding the use of elastic or damping elements able to stop reel 4 itself. It has been shown that making heads 4' 4" wholly or partially of antifriction synthetic resins makes said reel 4 able to be used also in tying devices in which reel 4 itself, rather than running, as said, in guide (5), has to be moved along its axis, sliding on support surfaces or similar elements. Such a device is contemplated, for example, in Swiss Patent No. 639,535 granted Nov. 30, 1983.

The device shown in the drawings and illustrated in this description represents a preferred embodiment, without thereby being limiting or binding in regard to possible variations, within the scope of the claims, to be determined each time by particular production requirements.

Figure 3:
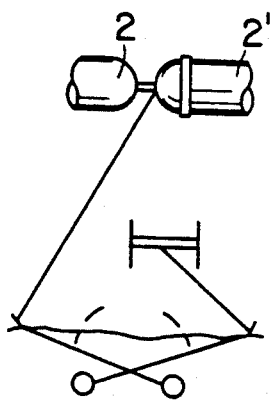
Figure 4:
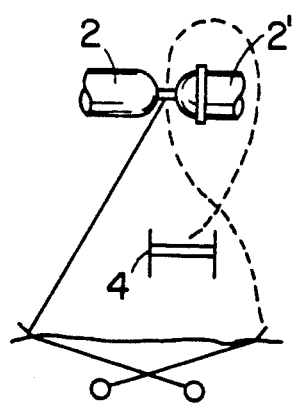
Figure 5:
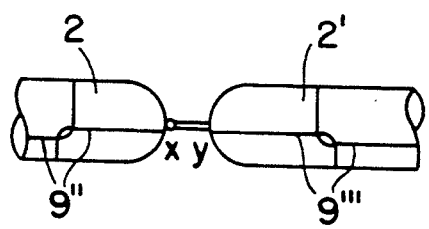

I claim:

1. Device for automatically forming a suspension loop of sausage at preprogrammable intervals, in a machine for automatically tying, by string with a knot, meat stuffed in a casing, said machine comprising:

an orifice (1 in FIG. 1) through which a stuffed casing (2, 2') passes (FIGS. 3, 4, 5);

interpenetrated jaws (3, 3') for gripping the casing (2, 2') at a predetermined section (x-y in FIG. 5) and for arranging the casing (2, 2') for tying at said predetermined section (x-y in FIG. 5);

a reel (4) for holding a reserve of string;

a guide (5) for moving the reel (4) around the casing (2, 2') at the predetermined section (x-y in FIG. 5) to make a knot of the string around said predetermined section (x-y in FIG. 5);

wherein said reel (4) makes it possible to avoid unwinding of the string by inertia in a descent phase within said guide (5) due to the fact that said reel (4) has two heads (4', 4" in FIG. 11) which have geometric shapes provided with vertices, said vertices running along the guide (5) with friction of a preset amount so that said vertices are able to make the reel (4), at the end of a movement cycle around the casing (2, 2'), retain a preset kinetic energy.

2. Device according to claim 1, wherein the two heads 4', 4" are made wholly or at least partially of antifriction synthetic resins.

3. Device according to claim 1, wherein the two heads (4', 4") carry rolling elements (35, 36, 37, 38).

4. Device according to claim 1, wherein said heads (4', 4") have square shapes.

5. Device according to claim 1, wherein, during the movement of reel (4), a hub (4''') of the reel (4) itself rotates on self-lubricating bushings (4'''') with respect to the two heads (4', 4").

* * * * *